(12) United States Patent
Huang et al.

(10) Patent No.: US 11,380,063 B2
(45) Date of Patent: Jul. 5, 2022

(54) THREE-DIMENSIONAL DISTORTION DISPLAY METHOD, TERMINAL DEVICE, AND STORAGE MEDIUM

(71) Applicant: Guangdong Virtual Reality Technology Co., Ltd., Guangzhou (CN)

(72) Inventors: Sibin Huang, Guangzhou (CN); Jingwen Dai, Guangzhou (CN); Jie He, Guangzhou (CN)

(73) Assignee: Guangdong Virtual Reality Technology Co., Ltd., Guangzhou (CN)

( * ) Notice: Subject to any disclaimer, the term of this patent is extended or adjusted under 35 U.S.C. 154(b) by 200 days.

(21) Appl. No.: 16/731,094

(22) Filed: Dec. 31, 2019

(65) Prior Publication Data
US 2020/0134927 A1 Apr. 30, 2020

Related U.S. Application Data

(63) Continuation of application No. PCT/CN2019/104240, filed on Sep. 3, 2019.

(30) Foreign Application Priority Data

Sep. 3, 2018 (CN) .......................... 201811020965.1
Sep. 3, 2018 (CN) .......................... 201811023501.6
Sep. 3, 2018 (CN) .......................... 201811023521.3

(51) Int. Cl.
*G06T 19/00* (2011.01)
*H04N 13/344* (2018.01)
(Continued)

(52) U.S. Cl.
CPC ............ *G06T 19/006* (2013.01); *G02B 30/22* (2020.01); *H04N 13/111* (2018.05); *H04N 13/344* (2018.05)

(58) Field of Classification Search
None
See application file for complete search history.

(56) References Cited

U.S. PATENT DOCUMENTS

2012/0079426 A1* 3/2012 Jin ...................... H04N 13/156
715/810
2013/0218542 A1* 8/2013 Yerli ...................... G06T 13/20
703/6

(Continued)

FOREIGN PATENT DOCUMENTS

CN  103792674  *  5/2014
CN  106444023  *  2/2017

OTHER PUBLICATIONS

Kato, Hirokazu, and Mark Billinghurst. "Marker tracking and hmd calibration for a video-based augmented reality conferencing system." Proceedings 2nd IEEE and ACM International Workshop on Augmented Reality (IWAR'99). IEEE, 1999 (Year: 1999).*

(Continued)

*Primary Examiner* — Sarah Le
(74) *Attorney, Agent, or Firm* — W&G Law Group (57) ABSTRACT

A three-dimensional display method is provided and comprises: acquiring target space coordinates of a target marker in a physical space; converting the target space coordinates into rendering coordinates in a virtual space; acquiring data of a virtual object to be displayed, and rendering, based on the data of the virtual object and the rendering coordinates, the virtual object to obtain a left-eye display content and a right-eye display content of the virtual object; and displaying the left-eye display content and the right-eye display content. The left-eye display content is projected onto a first optical lens, the right-eye display content is projected onto a second optical lens, and the first optical lens and the second optical lens respectively reflect the left-eye display content and the right-eye display content to human eyes. The method (Continued)

can achieve alignment display of the virtual object with the target marker, and a stereoscopic display.

13 Claims, 7 Drawing Sheets

(51) Int. Cl.
*H04N 13/111* (2018.01)
*G02B 30/22* (2020.01)

(56) References Cited

U.S. PATENT DOCUMENTS

| | | | |
|---|---|---|---|
| 2015/0160457 A1* | 6/2015 | Larson | G02B 27/0101 |
| | | | 359/630 |
| 2015/0261291 A1* | 9/2015 | Mikhailov | G06T 7/73 |
| | | | 345/156 |
| 2016/0086386 A1* | 3/2016 | Son | G02B 27/017 |
| | | | 345/633 |
| 2019/0236805 A1* | 8/2019 | Mou | G06K 9/6211 |
| 2021/0120221 A1* | 4/2021 | Li | H04N 13/268 |

OTHER PUBLICATIONS

International Search Report (PCT/CN2018/107919); dated May 23, 2019.

* cited by examiner

Establishing conversion formula between the first spatial coordinate system and the second spatial coordinate system according to a pose conversion algorithm, the conversion formula including the rotation parameter and the translation parameter ⎯ S241

Acquiring coordinate pairs of which the quantity is greater than a preset value, and substituting the acquired coordinate pairs into the conversion formula to obtain the rotation parameter and the translation parameter between the first spatial coordinate system and the second spatial coordinate system ⎯ S242

FIG. 10

THREE-DIMENSIONAL DISTORTION DISPLAY METHOD, TERMINAL DEVICE, AND STORAGE MEDIUM

TECHNICAL FIELD

The present disclosure relates to the field of display technologies, and in particular, to a three-dimensional display method, a terminal device, and a storage medium.

BACKGROUND

In recent years, with the advancement of science and technology, technologies such as Augmented Reality have gradually become a research hotspot all over the world. Augmented Reality is a technique that increases a user's perception of the physical world through information provided by a computer system, and it superimposes content such as computer-generated virtual objects, scenes, or system prompts on physical scenes, to enhance or modify the perception of physical-world environments or data representing the physical-world environments. It is an urgent problem to be solved how to physicalize a three-dimensional display of a virtual content coordinating with the physical scene when a device displays the virtual content.

SUMMARY

The present disclosure provides a three-dimensional display method, a terminal device, and a storage medium, which achieve an alignment display of a three dimensional virtual content with a physical object.

In a first aspect, an embodiment of the present disclosure provides a three-dimensional display method, comprising: determining, by a terminal device, target space coordinates of a target marker in a physical space; converting, by the terminal device, the target space coordinates into rendering coordinates in a virtual space; acquiring, by the terminal device, data of a virtual object to be displayed; rendering, by the terminal device, the virtual object based on the data of the virtual object and the rendering coordinates to obtain a left-eye display content and a right-eye display content of the virtual object; and displaying, by the terminal device, the left-eye display content and the right-eye display content, wherein the left-eye display content is projected onto a first optical lens, the right-eye display content is projected onto a second optical lens, and the first optical lens and the second optical lens respectively reflect the left-eye display content and the right-eye display content to a user's eyes.

In a second aspect, an embodiment of the present disclosure provides a data processing method applied in a terminal device. The method includes: displaying, by a display, a virtual marker, acquiring first coordinates of a physical marker in a first spatial coordinate system when an alignment determination operation by a user is detected, wherein the alignment determination operation indicates that the virtual marker is aligned with the physical marker, and the virtual marker corresponds to the physical marker, acquiring second coordinates of the virtual marker in a second spatial coordinate system; and calculating conversion parameters between the first spatial coordinate system and the second spatial coordinate system based on the first coordinates of the physical marker and the second coordinates of the virtual marker corresponding to the physical marker.

In a third aspect, an embodiment of the present disclosure provides a method for correcting an optical distortion, which is applied in a terminal device. The method includes acquiring coordinate data of an undistorted virtual image; acquiring a pre-distorted image to be displayed, according to the coordinate data of the undistorted virtual image and an optical distortion model, the optical distortion model being configured to fit an optical distortion generated by an optical lens; and displaying the pre-distorted image in such a manner that the pre-distorted image is projected onto the optical lens and is reflected by the optical lens to human eyes to form the undistorted virtual image.

In a fourth aspect, an embodiment of the present disclosure provides a terminal device. The terminal device includes a memory and one or more processors. The memory is coupled to the processor and has a computer program stored therein. The computer program, when executed by the one or more processors, causes the one or more processors to perform operations of methods in above embodiments.

In a fifth aspect, an embodiment of the present disclosure provides a computer readable storage medium. The computer readable storage medium has a program code stored thereon. The program code, when executed by a processor, causes the processor to perform operations of methods in above embodiments.

BRIEF DESCRIPTION OF DRAWINGS

In order to more clearly illustrate the technical solutions in embodiments of the present disclosure, the drawings used in the description of the embodiments will be briefly described below. The drawings in the following description are only some embodiments of the present application. For those skilled in the art, other drawings can also be obtained based on these drawings without paying any creative effort.

DESCRIPTION OF EMBODIMENTS

Figure 1:
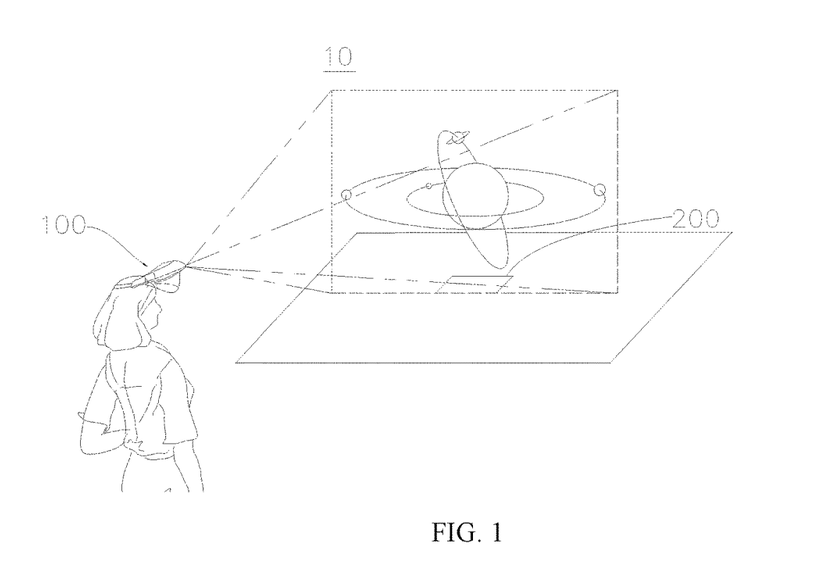
FIG. 1 is a schematic diagram showing an augmented reality system according to an embodiment of the present disclosure.

Referring to FIG. 1, an embodiment of the present application provides an augmented reality system 10, including a terminal device 100 and a marker 200. The terminal device 100 can be a head mounted display device such as an integrated head mounted display device or a head mounted display device connected to an external electronic device. The terminal device 100 can also be a smart terminal such as a mobile phone connected to an external head mounted display device or a plug-in head mounted display device. Namely, the terminal device 100, as a processing and storage device for the head mounted display device, is plugged in or accesses the external head mounted display device to display a virtual object.

A camera is provided on the terminal device 100. When the marker 200 is located in a visual range of the camera, the camera can capture an image containing the marker 200. The terminal device 100 can identify the marker 200 in the image, and acquire spatial position information, such as a position and an orientation, of the marker 200 relative to the terminal device 100, and an identity of the marker 200.

In some embodiments, the marker 200 may include a graphic pattern having a topology structure, and the topology structure refers to a connection relationship between sub-markers and feature points of the marker 200 and is configured to indicate the identity information of the marker 200. The marker 200 may be other patterns, which is not limited herein.

The head mounted display device can include a first optical lens and a second optical lens to respectively project light emitted by an image source to an observation position of a left eye and an observation position of a right eye, thereby respectively presenting a display content corresponding to the left eye and a display content corresponding to the right eye to a user's left eye and the user's right eye to achieve a stereoscopic display.

Figure 2:
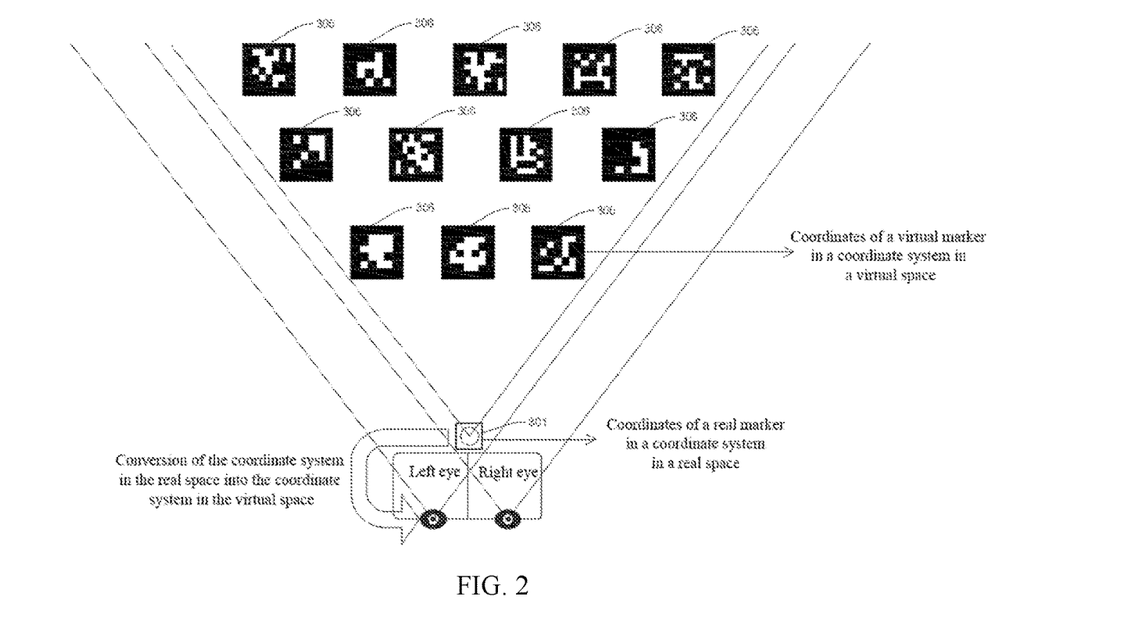
FIG. 2 is a schematic diagram showing a scene according to an embodiment of the present disclosure.

Referring to FIG. 2, when a virtual marker displayed by the head mounted display device is aligned with a physical marker 306, conversion parameters between a coordinate system of a physical space and a coordinate system of a virtual space are acquired by using coordinates of the physical marker 306 in the coordinate system in the physical space and coordinates of the virtual marker in the coordinate system in the virtual space, where the coordinates of the physical marker 306 are calculated by the terminal device.

Figure 3:
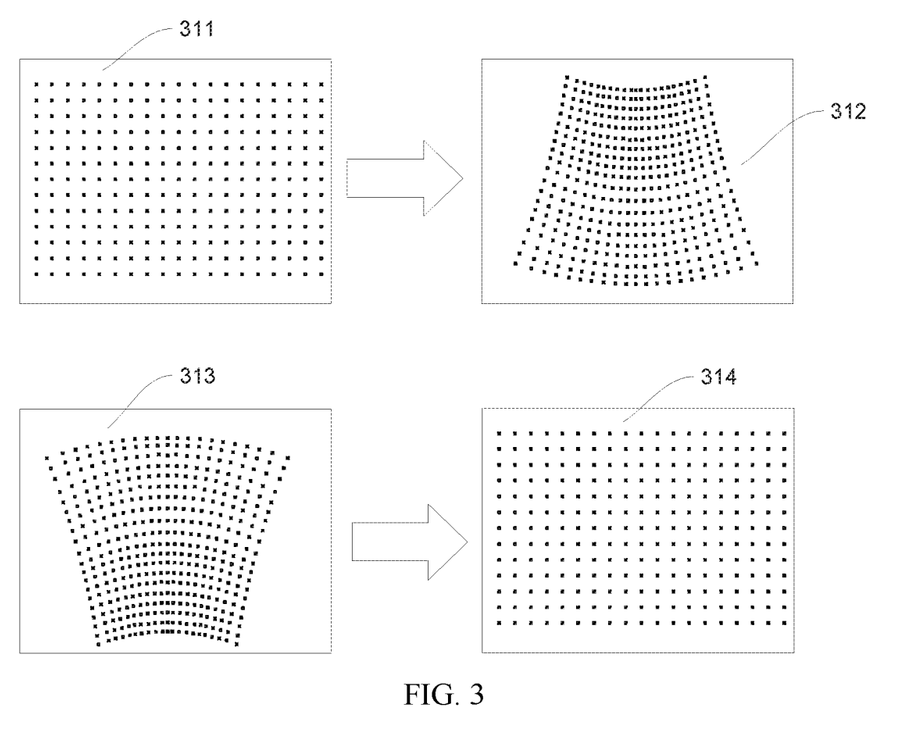
FIG. 3 is a schematic diagram showing another scene according to an embodiment of the present disclosure.

Because of factors of the optical lens itself, distortion occurs to a virtual image formed by a displayed image. Therefore, the displayed image can be pre-distorted and then displayed, which physicalizing a distortion correction. As shown in FIG. 3, a normal undistorted physical image 311 is reflected by the optical lens to form a distorted virtual image 312. An undistorted virtual image 314 can be obtained, and then a pre-distortion is performed on the undistorted virtual image 314 to obtain a pre-distorted image 313. After the pre-distorted image 313 is subjected to the optical distortion of the optical lens, the undistorted virtual image 314 is formed.

Figure 4:
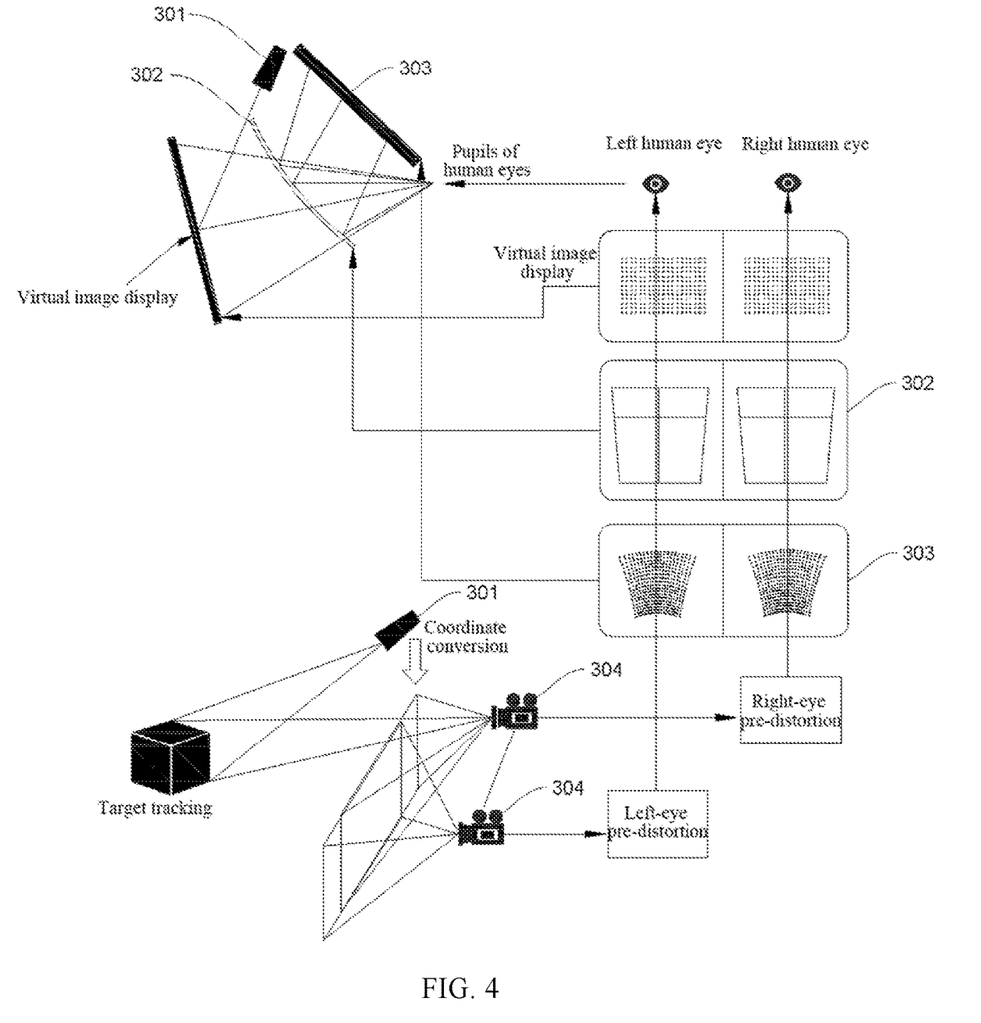
FIG. 4 is a schematic diagram showing yet another scene according to an embodiment of the present disclosure.

Referring to FIG. 4, the terminal device can achieve a stereoscopic display with alignment of virtual contents with physical contents, and the terminal device is used to identify a tracking target provided with the marker to obtain coordinates of the tracking target in a coordinate system with the tracking camera 301 as an origin in the physical space. And then a coordinate conversion is performed. In the coordinate conversion, according to the conversion parameters between the coordinate system in the physical space and the coordinate system in the virtual space, coordinates of the tracking target in the coordinate system in the physical space are converted into rendering coordinates in a coordinate system with a virtual camera 304 as an origin in the virtual space. A left-eye display image and a right-eye display image are generated according to the rendering coordinates. A left-eye pre-distortion is performed on the left-eye display image to obtain a left-eye pre-distorted image. A right-eye pre-distortion is performed on the right-eye display image to obtain a right-eye pre-distorted image. After being displayed by a display screen 303, the left-eye pre-distorted image and the right-eye pre-distorted image are projected onto the human eyes through the optical lenses 302 to form an undistorted left-eye virtual image and an undistorted right-eye virtual image, thereby achieving alignment display with the physical content, stereoscopic display, and undistorted display, of the virtual content.

Figure 5:
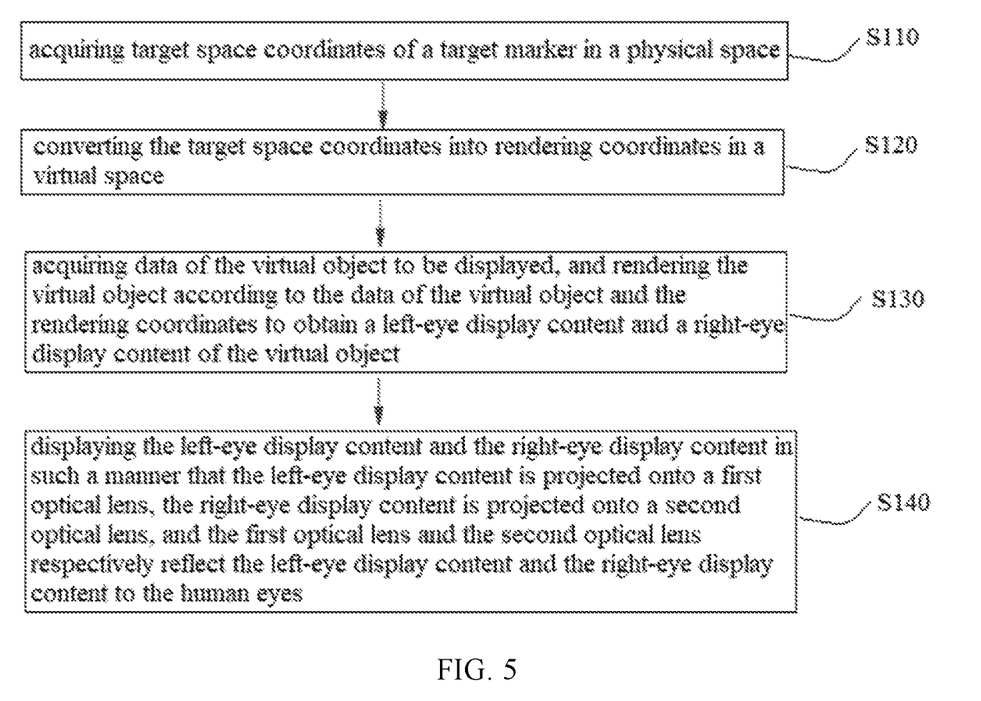
FIG. 5 is a flowchart of a three-dimensional display method according to an embodiment of the present disclosure.

Referring to FIG. 5, an embodiment of the present disclosure provides a three-dimensional display method that is applied to a terminal device. The method includes blocks S110 to S140.

Block S110: acquiring target space coordinates of a target marker in a physical space.

When alignment display of a virtual object with a physical target marker is physicalized, the target space coordinates of the target marker in the physical space can be acquired. The target space coordinates represent a positional relationship between the target marker and the tracking camera on the head mounted display device, and can also represent a positional relationship between the target marker and the terminal device.

After acquiring an image containing the target marker, the terminal device recognizes the target marker in the image, and obtains a recognition result of the target marker, thereby obtaining target space coordinates of the target marker in a first spatial coordinate system with the tracking camera of the terminal device as an origin in the physical space. The tracking camera is configured to track physical objects. The recognition result of the target marker includes a spatial position of the target marker relative to the terminal device, and an identity of the target marker. The spatial position includes a position and a pose of the target marker relative to the terminal device. The pose includes a relative orientation and a rotation angle.

Block S120: converting the target space coordinates into rendering coordinates in the virtual space.

In one embodiment, the converting the target space coordinates into rendering coordinates in the virtual space comprises: reading stored conversion parameters between the first spatial coordinate system and a second spatial coordinate system with a virtual camera as an origin in the virtual space; and converting the target space coordinates into the rendering coordinates in the virtual space based on the conversion parameters. The conversion parameters are used to align the first spatial coordinate system with the second spatial coordinate system to implement a conversion there between. The conversion parameters are parameters in conversion formula between the first spatial coordinate system and the second spatial coordinate system. The rendering coordinates in the second spatial coordinate system in the virtual space can be obtained through calculation by substituting the target space coordinates and the conversion parameters into the conversion formula. The virtual camera is configured to simulate visual angles of the human eyes in a 3D software system. According to a change of movement of the virtual camera, i.e., movement of the head, a change of movement of the virtual object in the virtual space is tracked, then rendered, and projected onto the optical lenses to physicalize the stereoscopic display.

Block S130: acquiring data of the virtual object to be displayed, and rendering the virtual object according to the data of the virtual object and the rendering coordinates to obtain a left-eye display content and a right-eye display content of the virtual object.

The data corresponding to the virtual object to be displayed includes model data configured for rendering the virtual object, for example, the model data may include color, vertex coordinates, and contour of a model corresponding to the virtual object.

In one embodiment, the virtual camera includes a left virtual camera and a right virtual camera. The left virtual camera is configured to simulate the left eye of the human eyes, and the right virtual camera is configured to simulate the right eye of the human eyes. The rendering, according to the data of the virtual object and the rendering coordinates, the virtual object to obtain a left-eye display content and a right-eye display content of the virtual object includes: constructing and rendering the virtual object according to the data of the virtual object; and respectively calculating, according to the rendering coordinates, pixel coordinates of the virtual object in the left virtual camera and pixel coordinates of the virtual object in the right virtual camera to obtain the left-eye display content and the right-eye display content.

According to the rendered virtual object, spatial coordinates of each vertex of the virtual object in the second spatial coordinate system can be obtained. The spatial coordinates are substituted into the conversion formula between a pixel coordinate system corresponding to the left virtual camera and the second spatial coordinate system to obtain pixel coordinates of each vertex of the virtual object in the left virtual camera. The left-eye display content is obtained according to pixel values of all vertexes of the virtual object and the pixel coordinates of all vertexes of the virtual object in the left virtual camera. The right-eye display content can also be obtained similarly.

Block S140: displaying the left-eye display content and the right-eye display content in such a manner that the left-eye display content is projected onto a first optical lens, the right-eye display content is projected onto a second optical lens, and the first optical lens and the second optical lens respectively reflect the left-eye display content and the right-eye display content to the human eyes.

Figure 6:
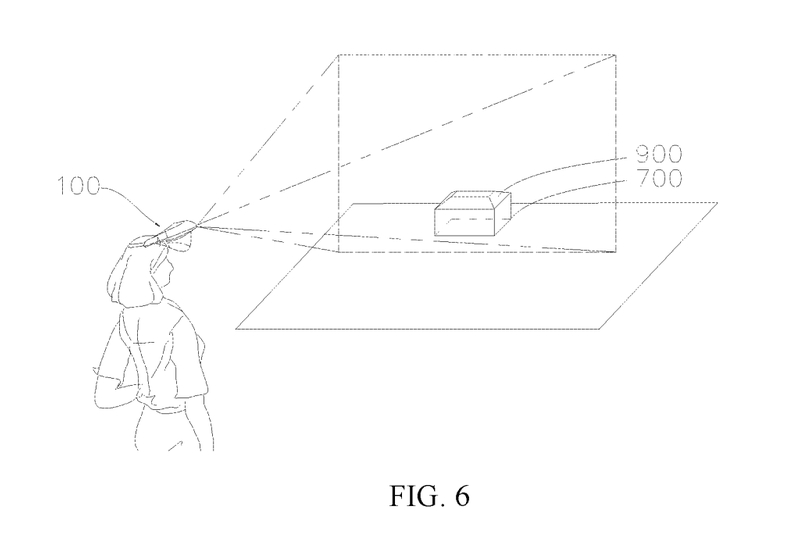
FIG. 6 is a schematic diagram showing an effect according to an embodiment of the present disclosure.

Specifically, the left-eye display content is incident on the user's left eye after being reflected by the first optical lens, and the right eye display content is incident on the user's right eye after being reflected by the second optical lens. The user can observe that the left-eye display content and the right-eye display content with an optical parallax between the two are fused by the brain to form stereoscopic display contents, thereby realizing the alignment of the virtual object with the target marker and the stereoscopic display. As shown in FIG. 6, after the left-eye display content and the right-eye display content are displayed, the user can observe alignment display of a stereoscopic virtual object 900 with the target marker 700.

Figure 7:
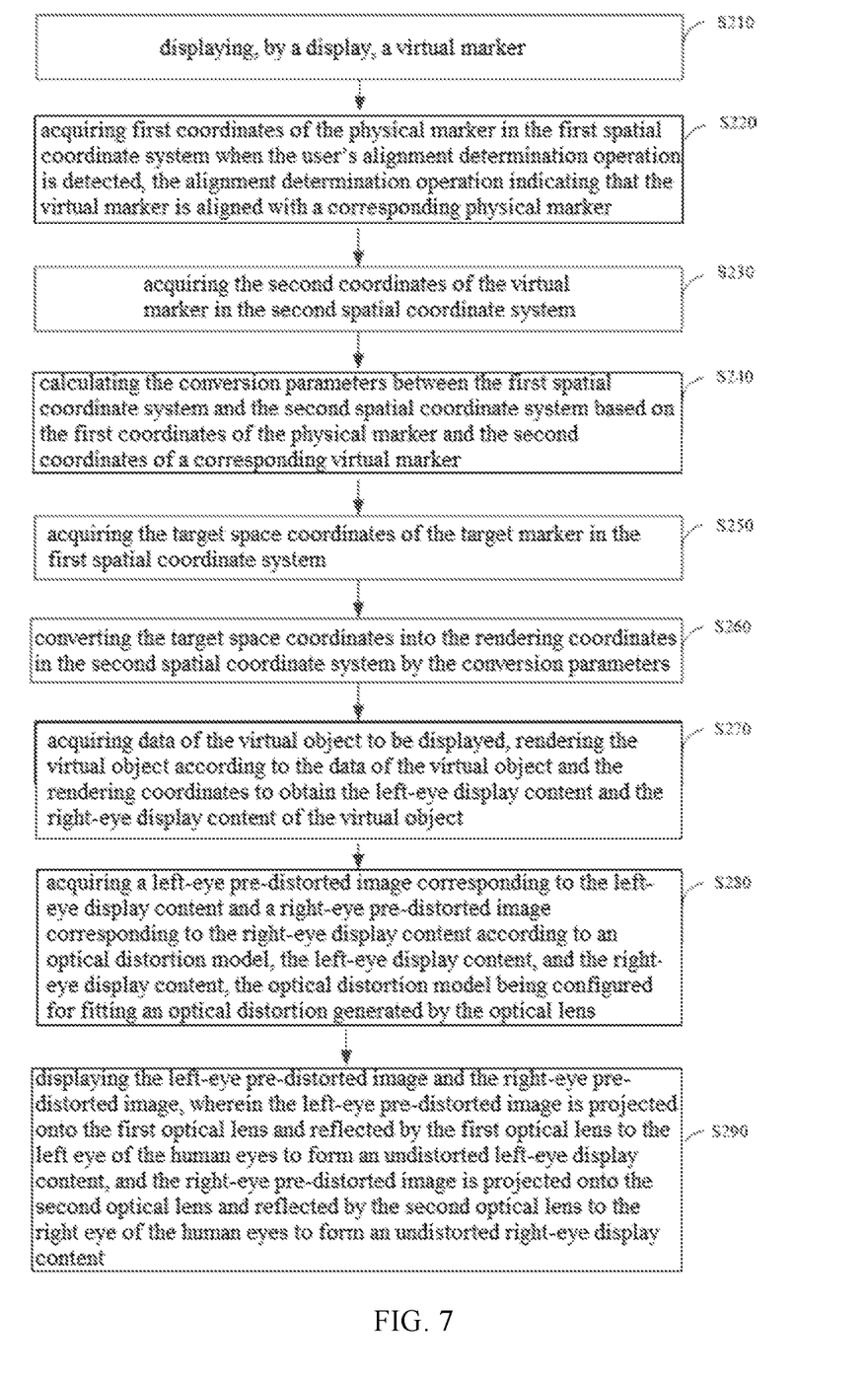
FIG. 7 is a flowchart of a three-dimensional display method according to another embodiment of the present disclosure.

FIG. 7 shows a three-dimensional display method according to yet another embodiment of the present disclosure that is applied to a terminal device, and the method includes blocks S210 to S290.

Block S210: displaying, by a display, a virtual marker.

To realize the alignment display of the virtual content with the physical content, it is necessary to acquire the conversion parameters between the spatial coordinate systems. When the conversion parameters are obtained, the virtual marker can be displayed. Moreover, a physical marker can be set in a physical scene, and is disposed within a visual range of the camera of the terminal device for subsequent alignment display of the virtual marker with the physical marker. The virtual marker can be pre-stored in the terminal device, and an image of the virtual marker has same shape and size as the physical marker.

When the virtual marker is displayed, a left-eye display content corresponding to the virtual marker is projected onto a left-eye optical lens and reflected by the left-eye optical lens to the user's left eye, and a corresponding right-eye content is projected onto a right-eye optical lens and reflected by the right-eye optical lens to the user's right eye, thereby achieving the stereoscopic display. The user can observe that the virtual marker is superimposed into a physical scene where the physical marker is located.

The terminal device is a head-mounted display device, and before the virtual marker is displayed, a parameter for optical distortion correction of the head-mounted display device can be determined to ensure normal display of the virtual marker, that is, displaying an undistorted virtual marker.

When verifying the parameter for the optical distortion correction, the user can determine the parameter for the optical distortion correction by displaying a preset image, for example, a checkerboard image. The user can perform a determination operation of the parameter for the optical distortion correction when ensuring that the displayed preset image is undistorted. When the terminal device detects the determination operation of the user, the terminal device can determine that the parameter for optical distortion correction is accurate.

Figure 8:
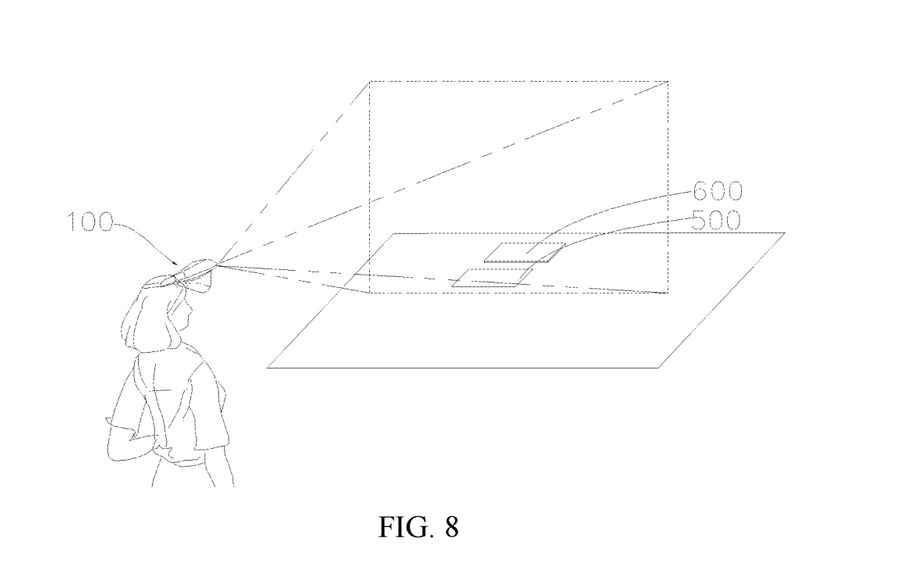
FIG. 8 is a schematic diagram showing a usage scene according to an embodiment of the present disclosure.
Figure 9:
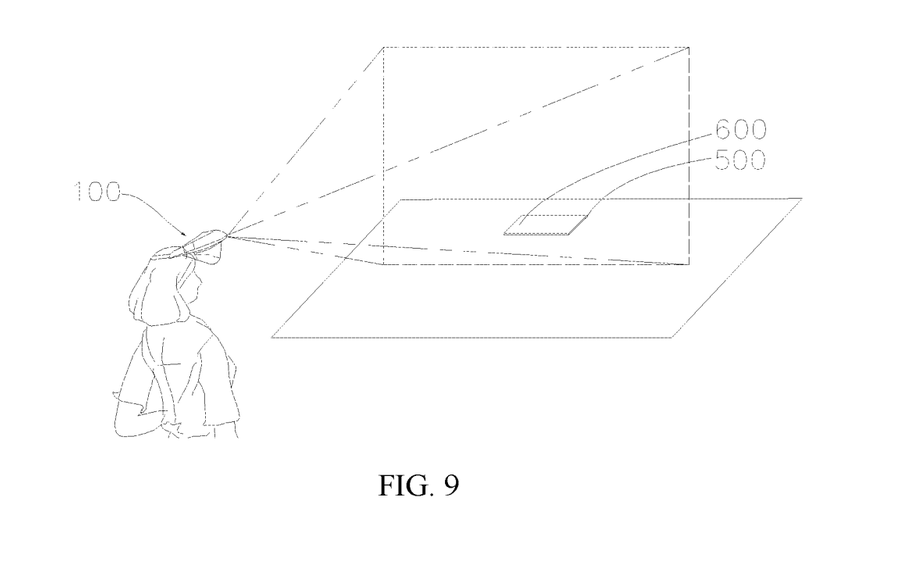
FIG. 9 is a schematic diagram showing another usage scene according to an embodiment of the present disclosure.

After the virtual marker is displayed, the user can observe that the virtual marker is superimposed into the physical scene where the physical marker is located. At this time, the virtual marker in the virtual space may be not aligned with the physical marker. As shown in FIG. 8, the virtual marker 600 is not aligned with the physical marker 500. Or, the virtual marker may be in alignment with the physical marker. As shown in FIG. 9, the physical marker 500 is aligned with the virtual marker 600. The "aligned" refers to a situation in which a position of the virtual marker in the virtual space is the same as a position of the physical marker in the virtual space, and can also be interpreted that the virtual marker and the physical marker are overlapped in the user's visual perception.

In some embodiments, the virtual marker can be aligned with the physical marker by controlling movement of the markers. The physical marker is disposed on a movement controllable mechanism, and the movement controllable mechanism is connected to the terminal device. The display method can further include transmitting a movement instruction to the movement controllable mechanism when the user's movement control operation is detected. The movement instruction is configured to instruct the movement controllable mechanism to move according to the movement control operation. The user can perform the movement control operation on the terminal device to control the movement of the movement controllable mechanism and in turn control the movement of the marker. The movement control operation can be performed by a key or a touch screen of the terminal device and can also be performed by a controller connected to the terminal device, which is not limited herein.

Block S220: acquiring first coordinates of the physical marker in the first spatial coordinate system when the user's alignment determination operation is detected, the alignment determination operation indicating that the virtual marker is aligned with a corresponding physical marker.

When observing that the virtual marker is not aligned with the physical marker, the user can move the physical marker to change its position until the virtual marker is observed to be aligned with the physical marker, and the alignment determination operation is performed on the terminal device.

When observing that the virtual marker is aligned with the physical marker, the user can perform the alignment determination operation on the terminal device for indicating the alignment of the virtual marker with the physical marker, and at this time, a display with the virtual marker being aligned with the physical marker is realized.

The alignment determination operation can be performed through a key or a touch screen of the terminal device and can also be performed by a controller connected to the terminal device, which is not limited herein.

The terminal device can detect the alignment determination operation performed by the user and determine that the virtual marker is aligned with the physical marker at this time, to determine the conversion parameters between the first spatial coordinate system and the second spatial coordinate system according to current coordinates of the physical marker in the first spatial coordinate system in the physical space and current coordinates of the displayed virtual object in the second spatial coordinate system in the virtual space.

In one embodiment, the first spatial coordinate system is a spatial coordinate system with the tracking camera as the origin in the physical space, and the second spatial coordinate system is a spatial coordinate system with the virtual camera as the origin in the virtual space. The tracking camera refers to a camera on the terminal device, and the virtual camera is a camera for simulating the visual angle of human eyes in the 3D software system. According to the change of the movement of the virtual camera, i.e., the movement of the head, the change of the movement of the virtual object in the virtual space is tracked and rendered, an image is generated based on the rendered virtual object, and the image is then projected onto the optical lens to achieve stereoscopic display.

In one embodiment, the first coordinates of the physical marker in the first spatial coordinate system are acquired upon detecting the alignment determination operation performed by the user. After capturing an image containing the physical marker, the terminal device can recognize the image to obtain a recognition result of the physical marker, and then acquire the first coordinates of the physical marker in the first spatial coordinate system. The recognition result of the physical marker can include a spatial position of the physical marker relative to the terminal device, and an identity of the physical marker. The spatial position of the physical marker relative to the terminal device can include position and pose of the physical marker relative to the terminal device. The pose includes orientation and a rotation angle of the physical marker relative to the terminal device.

In one embodiment, when acquiring a conversion relationship between the first spatial coordinate system and the second spatial coordinate system according to the first coordinates of the physical marker in the first spatial coordinate system and the second coordinates of the virtual marker in the second spatial coordinate system, the conversion relationship between the first spatial coordinate system and the second spatial coordinate system needs to be calculated according to first coordinates of a plurality of physical markers in the first spatial coordinate system and second coordinates of a plurality of virtual markers in the second spatial coordinate system, the plurality of physical markers being in a one-to-one correspondence with the plurality of virtual markers.

In one embodiment, the camera of the terminal device can be calibrated prior to capturing the image containing the physical marker, in order to ensure that accurate coordinates of the physical marker in the first spatial coordinate system are acquired.

Block S230: acquiring the second coordinates of the virtual marker in the second spatial coordinate system.

In one embodiment, the second coordinates of the virtual marker in the second spatial coordinate system can be acquired by the virtual camera tracking the virtual marker, thereby acquiring second coordinates of the plurality of virtual markers in the second spatial coordinate system, the plurality of virtual markers being in a one-to-one correspondence with the plurality of physical markers.

In one embodiment, after acquiring the first coordinates of the plurality of physical markers in the first spatial coordinate system and the second coordinates of the plurality of virtual markers in the second spatial coordinate system, the first coordinates of each physical marker and the second coordinates of a corresponding virtual marker can be stored as a coordinate pair according to the one-to-one correspondence between the plurality of physical markers and the plurality of virtual markers, for the calculation of the conversion parameters. For example, the physical marker A corresponds to the virtual marker a, the physical marker B corresponds to the virtual marker b, the first coordinates of the physical marker A and the second coordinates of the virtual marker a are stored as one coordinate pair, and the first coordinates of the physical marker B and the second coordinates of the virtual marker b are stored as one coordinate pair.

Block S240: calculating the conversion parameters between the first spatial coordinate system and the second spatial coordinate system based on the first coordinates of the physical marker and the second coordinates of a corresponding virtual marker.

Figure 10:
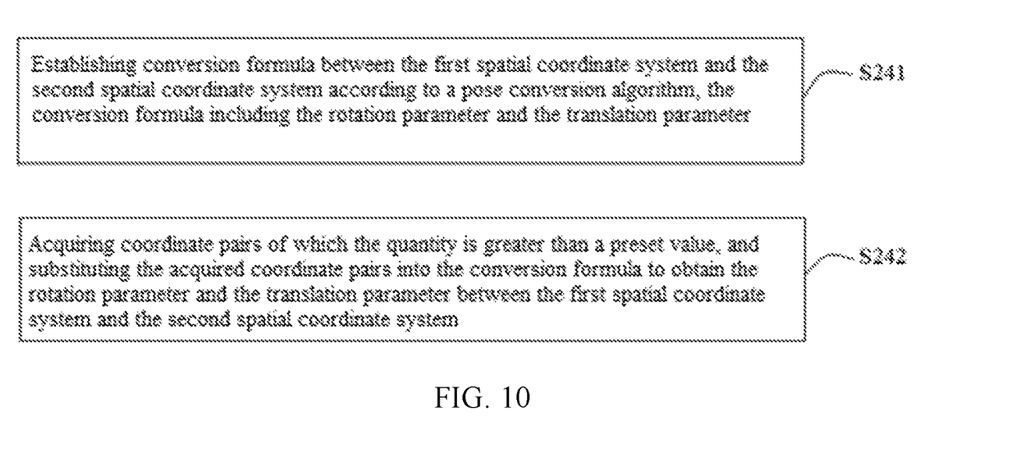
FIG. 10 is a flowchart of a block S240 of a display method according to an embodiment of the present disclosure.

The conversion parameters between the first spatial coordinate system and the second spatial coordinate system can include a rotation parameter and a translation parameter. Referring to FIG. 10, in some embodiments, block S240 can includes blocks S241 and S242.

Block S241: establishing conversion formula between the first spatial coordinate system and the second spatial coordinate system according to a pose conversion algorithm, the conversion formula including the rotation parameter and the translation parameter.

In one embodiment, when calculating the conversion parameters between the first spatial coordinate system and the second spatial coordinate system, the conversion formula between the first spatial coordinate system and the second spatial coordinate system can be acquired. For example, the conversion formula between the first spatial coordinate system and the second spatial coordinate system can be established according to the pose conversion algorithm. The pose conversion algorithm can include a rigid conversion estimation algorithm, a PNP algorithm, a DCM algorithm, or a POSIT algorithm, which is not limited herein.

The above conversion formula represents a conversion relationship between coordinates in the first spatial coordinate system and coordinates in the second spatial coordinate system, and includes the conversion parameters. The conversion formula can express that coordinates in the second spatial coordinate system is obtained through coordinates in the first spatial coordinate system and the conversion parameters. The conversion formula can also express that coordinates in the first spatial coordinate system is obtained through coordinates in the second spatial coordinate system and the conversion parameters.

Further, the conversion formula can express that a matrix composed of coordinates in the second spatial coordinate system is obtained by multiplying a matrix composed of coordinates in the first spatial coordinate system and a matrix composed of the conversion parameters, and the matrix composed of the conversion parameters includes a rotation parameter and a translation parameter.

Block S242: acquiring coordinate pairs of which the quantity is greater than a preset value, and substituting the acquired coordinate pairs into the conversion formula to obtain the rotation parameter and the translation parameter between the first spatial coordinate system and the second spatial coordinate system.

In an embodiment, after the conversion formula between the first spatial coordinate system and the second spatial coordinate system is obtained, the conversion parameters in the conversion formula can be solved by the first coordinates of the physical marker and the second coordinates of a corresponding virtual marker. For example, a preset number of stored coordinate pairs between first coordinates and corresponding second coordinates can be read and substituted into the conversion formula to solve the conversion parameters in the conversion formula, thereby obtaining the rotation parameter and the translation parameter. The preset number is determined according to a conversion formula established by a specifically utilized pose conversion algorithm. For example, when the conversion formula is established according to the rigid conversion estimation algorithm, the preset number can be set to 4.

With first coordinates in the first spatial coordinate system in each coordinate pair corresponding to second coordinates in the second spatial coordinate system in the coordinate pair, the coordinate pairs are substituted into the conversion formula, that is, the first coordinates and the second coordinates in the coordinate pairs are substituted into the conversion formula. The first coordinates are substituted into the matrix composed of the coordinates in the first spatial coordinate system in the conversion formula, and the second coordinates are substituted into the matrix composed of the coordinates of the second space system in the conversion formula. After substituting the preset number of coordinate pairs (one coordinate pair per substitution) into the conversion formula, the matrix composed of the conversion parameters in the conversion formula can be solved to obtain the rotation parameter and the translation parameter in the matrix, that is, to obtain the rotation parameter and the translation parameter between the first spatial coordinate system and the second spatial coordinate system.

In some embodiments, after acquiring the conversion parameters between the first spatial coordinate system and the second spatial coordinate system, the display method can further include fine adjusting at least one of a first camera parameter of the tracking camera and a second camera parameter of the virtual camera. Due to a specular refraction of the optical lens and errors of the pose conversion algorithm, the virtual content may not be accurately aligned with the physical content when the conversion parameters are used to display the virtual content with the virtual content being superimposed on the content in the physical scene. Therefore, some fine adjustments can be performed to the first camera parameter of the tracking camera and/or the second camera parameter of the virtual camera such that when the virtual content is displayed using the conversion parameters, the virtual content is completely aligned with the physical content. For example, a tilt angle, a depth, and the like of the tracking camera, the virtual camera, or both the tracking camera and the virtual camera can be adjusted.

Block S250: acquiring the target space coordinates of the target marker in the first spatial coordinate system.

In one embodiment, the target space coordinates of the target marker in the first spatial coordinate system, i.e., coordinates of the target marker in the spatial coordinate system with the tracking camera as the origin in the physical space, can be acquired. The alignment display of the virtual object with the target marker can be realized based on the target space coordinates. The target marker is similar to the physical marker. The terminal device can capture the image containing the target marker and recognize the image containing the target marker to acquire the target space coordinates of the target marker in the first spatial coordinate system.

Block S260: converting the target space coordinates into the rendering coordinates in the second spatial coordinate system by the conversion parameters.

The target space coordinates of the target marker in the first spatial coordinate system and the conversion parameters can be substituted into the conversion formula between the first spatial coordinate system and the second spatial coordinate system to calculate and obtain the rendering coordinates in the second spatial coordinate system (that is, coordinates in the spatial coordinate system with the virtual camera as the origin in the virtual space), so as to generate the display content of the virtual object according to the target space coordinates.

Block S270: acquiring data of the virtual object to be displayed, rendering the virtual object according to the data of the virtual object and the rendering coordinates to obtain the left-eye display content and the right-eye display content of the virtual object.

After converting the target space coordinates of the target marker in the first spatial coordinate system into the rendering coordinates in the second spatial coordinate system, the data of the virtual object to be displayed can be acquired, and the virtual object is rendered according to the data of the virtual object and the rendering coordinates. The data corresponding to the virtual object to be displayed can include model data of the virtual object, and the model data is used for rendering the virtual object. For example, the model data includes data for establishing color, vertex coordinates, and contour of the model corresponding to the virtual object. After the virtual object is rendered, the left-eye display content and the right-eye display content which have an optical parallax there between and correspond to the virtual object can be obtained to realize a stereoscopic displaying effect at the time of display.

Block S280: acquiring a left-eye pre-distorted image corresponding to the left-eye display content and a right-eye pre-distorted image corresponding to the right-eye display content according to an optical distortion model, the left-eye display content, and the right-eye display content, the optical distortion model being configured for fitting an optical distortion generated by the optical lens.

Since an optical system of the head mounted display device distorts the displayed image, if the left-eye display content and the right-eye display content are directly displayed, the user will observe a distorted virtual image. For example, in FIG. 3, a distorted virtual image 312 is generated after the physical image 311 is displayed. Therefore, before displaying the left-eye display content and the right-eye display content, the left-eye display content and the right-eye display content can be pre-distorted, so that the user can observe an undistorted virtual image.

In one embodiment, a reverse distortion can be performed on the left-eye display content according to a stored optical distortion model to obtain the left-eye pre-distorted image corresponding to the left-eye display content, and a reverse distortion can be performed on the right-eye display content according the optical distortion model to obtain the right-eye pre-distorted image corresponding to the right-eye display content. The optical distortion model is used to fit the optical distortion of the optical lens of the head mounted display device, and the optical distortion model can be:

$$\begin{cases} X = A * I_1 * I_2 \\ Y = B * I_3 * I_4 \end{cases} \quad \text{formula (1)}$$

Where X is an abscissa of a physical image, Y is an ordinate of the physical image, A is a first distortion parameter, B is a second distortion parameter, $I_1$ is a matrix that is used to fit a lateral radial distortion of the optical lens or fit a lateral barrel distortion of the optical lens, $I_2$ is a matrix that is used to fit a lateral tangential distortion of the optical lens, $I_3$ is a matrix that is used to fit a longitudinal radial distortion of the optical lens or is a matrix that is used to fit a longitudinal barrel distortion of the optical lens, $I_4$ is a matrix that is used to fit a longitudinal tangential distortion of the optical lens, $I_1$ includes an abscissa of a virtual image, $I_2$ includes the abscissa and an ordinate of the virtual image, $I_3$ includes the ordinate of the virtual image, and $I_4$ includes the abscissa and the ordinate of the virtual image.

In one embodiment, a correspondence relationship between the optical distortion model and the optical parameters of the optical lens can be stored, that is, optical distortion models corresponding to different optical parameters are stored. When reading an optical distortion model to pre-distort an image to be displayed, the optical distortion model corresponding to the optical parameters of the optical lens can be read.

When distorting the left-eye display content and the right-eye display content of the virtual object, the stored optical distortion model can be read. Coordinate data of the left-eye display content, taken as coordinate data of the virtual image, are substituted into the optical distortion model to calculate screen coordinate data corresponding to the left-eye display content, and the left-eye pre-distorted image to be displayed can be generated according to the screen coordinate data and pixel vertexes of the left-eye display content. The left-eye pre-distorted image corresponds to the left-eye display content. Similarly, coordinate data of the right-eye display content, taken as coordinate data of the virtual image, are substituted into the optical distortion model to calculate screen coordinate data corresponding to the right-eye display content, and the right-eye pre-distorted image to be displayed can be generated according to the screen coordinate data and pixel vertexes of the right-eye display content. The right-eye pre-distorted image corresponds to the right-eye display content.

In one embodiment, when there is a non-integer coordinate in the screen coordinate data obtained according to the optical distortion model, it is necessary to convert the non-integer coordinate into an integer coordinate to generate a pre-distorted image. In one embodiment, pixel interpolation can be used to convert the non-integer coordinate in the screen coordinate data into the integer coordinate. For example, a pixel coordinate closest to the integer coordinate can be acquired, and then the non-integer coordinate is replaced with the acquired pixel coordinate.

Block S290: displaying the left-eye pre-distorted image and the right-eye pre-distorted image, wherein the left-eye pre-distorted image is projected onto the first optical lens and reflected by the first optical lens to the left eye of the human eyes to form an undistorted left-eye display content, and the right-eye pre-distorted image is projected onto the second optical lens and reflected by the second optical lens to the right eye of the human eyes to form an undistorted right-eye display content.

After the left-eye pre-distorted image and the right-eye pre-distorted image are displayed, the left-eye pre-distorted image is projected onto the first optical lens and is then incident on the user's left eye after being reflected by the first optical lens. Due to the optical distortion caused by the first optical lens itself, a forward distortion is performed on the left-eye pre-distorted image obtained by the reverse distortion, and the reverse distortion and the forward distortion are neutralized to form the left-eye display content without distortion. Similarly, the right-eye pre-distorted image is projected onto the second optical lens and is then incident on the user's right eye after being reflected by the second optical lens to form the right-eye display content without distortion. The user can observe the undistorted left-eye display content and the undistorted right-eye display content having a parallax there between, which are then fused by the user's brain to form an undistorted stereoscopic display content, so that the alignment display of the virtual object with the target marker, an undistorted display of the virtual object and the stereoscopic display are achieved. For example, as shown in FIG. 3, the pre-distorted image 313 is displayed to form the undistorted virtual image 314, ensuring that the undistorted virtual image 314 coincides with the physical image 311.

In one embodiment, an optical distortion model can be acquired prior to the pre-distortion on the left-eye display content and the right-eye display content by the optical distortion model. Blocks of constructing the optical distortion model can include: reading optical manufacturer data of the optical lens, the optical manufacturer data including coordinate data of an experimental image and coordinate data of a distorted virtual image corresponding to the experimental image; performing a polynomial fitting on the coordinate data of the experimental image and the coordinate data of the distorted virtual image to obtain the optical distortion model; and storing the optical distortion model.

The optical manufacturer data can be provided by a manufacturer who produces the optical lens, i.e., the optical manufacturer data are optical data obtained by the manufacturer through testing the optical lens using the experimental image before the optical lens leaves the factory. The optical manufacturer data can include coordinate data of the experimental image and coordinate data of the distorted virtual image after the experimental image is displayed.

For example, the optical manufacturer data are shown in the following table:

| optical manufacturer data | | | |
| --- | --- | --- | --- |
| experimental image | | distorted virtual image | |
| X | Y | X | Y |
| 20 | 23 | 421.916 | 432.217 |
| 20 | 21.4 | 403.815 | 396.258 |
| 20 | 19.2 | 392.478 | 324.879 |
| 20 | 18.5 | 385.221 | 286.458 |
| 20 | 15.6 | 379.479 | 273.487 |
| 20 | 12.3 | 366.287 | 267.125 |

In one embodiment, after the optical manufacturer data of the optical lens are obtained, the coordinate data of the distorted virtual image can also be adjusted according to a display parameter. The display parameter includes at least one of a zoom ratio, a screen size, a pixel size, and a position of an optical center, of the screen of the head mounted display device.

It can be understood that the zoom ratio, the screen size, the pixel size, and the position of the optical center corresponding to the screen can be obtained, and then the coordinate data of the distorted virtual image corresponding to the experimental image are adjusted according to at least one parameter of the zoom ratio, the screen size, the pixel size, and the position of the optical center, to achieve correspondence of all vertexes between the experimental image and the distorted image with a high accuracy.

In an embodiment of the present disclosure, the performing the polynomial fitting on the coordinate data of the experimental image and the coordinate data of the distorted virtual image to obtain the optical distortion model includes: calculating a first distortion parameter and a second distortion parameter of the optical distortion model based on the coordinate data of the experimental image and the coordinate data of the distorted virtual image corresponding to the experimental image, the first distortion parameter being a coefficient for fitting a distortion of the optical lens in a first direction, and the second distortion parameter being a coefficient for fitting a distortion of the optical lens in a second direction; and constructing the optical distortion model based on the first distortion parameter and a second distortion parameter.

According to the formula (1), a distortion can be fitted by a lateral polynomial and a longitudinal polynomial. A first expression of the abscissa of the physical image can be obtained by multiplying the first distortion parameter by a first polynomial, and the first expression is $X=A*I_1*I_2$; a second expression of the ordinate of the physical image can be obtained by multiplying the second distortion parameter by a second polynomial, and the second expression is $Y=B*I_3*I_4$, where X is the abscissa of the physical image, Y is the ordinate of the physical image, A is the first distortion parameter, B is the second distortion parameter, $I_1$ is a matrix that is used to fit a lateral radial distortion of the optical lens or is a matrix that is used to fit a lateral barrel distortion of the optical lens, $I_2$ is a matrix that is used to fit a lateral tangential distortion of the optical lens, $I_3$ is a matrix that is used to fit a longitudinal radial distortion of the optical lens or is a matrix that is used to fit a longitudinal barrel distortion of the optical lens, $I_4$ is a matrix that is used to fit a longitudinal tangential distortion of the optical lens, $I_1$ includes the abscissa of the virtual image, $I_2$ includes the abscissa and the ordinate of the virtual image, $I_3$ includes the ordinate of the virtual image, and $I_4$ includes the abscissa and the ordinate of the virtual image.

The first distortion parameter is the coefficient for fitting the distortion of the optical lens in the first direction, and the second distortion parameter is the coefficient for fitting the distortion of the optical lens in the second direction. In addition, the first direction may be a lateral direction, and the second direction may be a longitudinal direction; or, the first direction may be a longitudinal direction, and the second direction may be a lateral direction.

The first polynomial is obtained by multiplying the matrix for fitting the lateral radial distortion of the optical lens by the matrix for fitting the lateral tangential distortion of the optical lens, or is obtained by multiplying the matrix for fitting the lateral barrel distortion of the optical lens by the matrix for fitting the lateral tangential distortion of the optical lens. The matrix for fitting the lateral radial distortion of the optical lens and the matrix for fitting the lateral barrel distortion of the optical lens each can be a matrix of four rows and one column, which is composed of the abscissa of the virtual image. The matrix for fitting the lateral tangential distortion of the optical lens is a matrix of four rows and one column, which is composed of the abscissa of the virtual image and the ordinate of the virtual image.

The second polynomial is obtained by multiplying the matrix for fitting the longitudinal radial distortion of the optical lens by the matrix for fitting the longitudinal tangential distortion of the optical lens, or is obtained by multiplying the matrix for fitting the longitudinal barrel distortion of the optical lens by the matrix for fitting the longitudinal tangential distortion of the optical lens. The matrix for fitting the longitudinal radial distortion of the optical lens and the matrix for fitting the longitudinal barrel distortion of the optical lens each can be a matrix of four rows and one column, which is composed of the ordinate of the virtual image. The matrix for fitting the longitudinal tangential distortion of the optical lens is a matrix of four rows and one column, which is composed of the abscissa of the virtual image and the ordinate of the virtual image.

After the first expression and the second expression are obtained, the coordinate data of the experimental image and the coordinate data of the distorted virtual image adjusted according to the display parameter can be substituted, and the first distortion parameter in the first expression and the second distortion parameter in the second expression are solved to obtain the first distortion parameter and the second distortion parameter.

After the first distortion parameter and the second distortion parameter are obtained, the first distortion parameter can be substituted into the first expression and the second distortion parameter is substituted into the second expression, so as to obtain the optical distortion model. The optical distortion model includes the first expression and the second expression.

In an embodiment of the present disclosure, after the optical distortion model is obtained, the obtained optical distortion model can also be examined to ensure an accuracy of the optical distortion model. Therefore, the display method can further include verifying the optical distortion model. Further, the verifying the optical distortion model can include: acquiring, by using coordinate data of an original image for verifying the optical distortion model and the optical distortion model, a verification image to be displayed, and displaying the verification image; performing image capture of the verification image displayed on the terminal device by a camera at a viewing position to obtain an image containing the verification image; determining whether parameters of the image containing the verification image satisfies a preset condition; and storing the optical distortion model if the preset condition is satisfied.

The original image for verifying the optical distortion model is pre-stored in the terminal device. For example, the original image can be a checkerboard. When the original image is displayed without distorting the original image using the optical distortion model, the virtual image displayed is distorted corresponding to the original image. If the original image is pre-distorted using the optical distortion model and then displayed, the virtual image displayed is without distortion, which indicates that the optical distortion model is accurate.

In one embodiment, the coordinate data of the original image can be inversely calculated by the obtained optical distortion model to obtain a verification image to be displayed corresponding to the original image.

The coordinate data of the original image, taken as the coordinate data of the virtual image, the virtual image at this time being an undistorted virtual image, are substituted into the optical distortion model to obtain screen coordinate data of the verification image to be displayed. According to the screen coordinate data and pixel values of all pixel points of the original image, the verification image to be displayed can be generated, and this verification image is an image pre-distorted by the optical distortion model.

After the verification image to be displayed is obtained, the verification image can be displayed, and then a camera at a viewing position can capture an image of the displayed verification image to obtain an image containing the displayed verification image. For example, an industrial camera can be arranged at a viewing position of the human eye in a helmet mounted display, to capture the displayed verification image.

After the image containing the displayed verification image is obtained, it can be determined whether an aspect ratio of the verification image in the image is a preset aspect ratio, and whether a linearity of the verification image in the image is a preset linearity. When the aspect ratio is the preset aspect ratio and the linearity is the preset linearity, it can be determined that the obtained optical distortion model is accurate, so the obtained optical distortion model can be stored, and the distortion correction during display is accomplished.

In one embodiment, after the verification image is displayed, a model determination operation performed by the user is detected, the model determination operation indicating the linearity and the preset aspect of the verification image are normal and a left visual angle coincides with a right visual angle at their junction, it is then determined that the optical distortion model is accurate and is stored.

The terminal device 100 in this disclosure can include one or more of the following components: a processor, a memory, a camera, and one or more applications, and the one or more applications can be stored in the memory and configured to be executed by one or more processors to perform the method as described in the foregoing method embodiments.

The processor can include one or more processing cores. The processor connects various parts in the entire terminal device by using various interfaces and lines, and conducts various functions and data processing of the terminal device through running or executing instructions, programs, code sets or instruction sets stored in the memory, and calling data stored in the memory. For example, the processor can be implemented in at least one hardware form of digital signal processor (DSP), field programmable gate array (FPGA), or programmable logic array (PLA). The processor can integrate one or more of a central processing unit (CPU), a graphics processing unit (GPU), a modem, and the like. The CPU mainly processes the operating system, user interface and applications, etc. The GPU is configured to render and graph a display content. The modem is configured to process wireless communication. It can be understood that the modem can also not be integrated in the processor 110 and can be implemented by a separate communication chip.

The memory can include a random access memory (RAM), or a read only memory (ROM). The memory can be configured to store instructions, programs, code, code sets, or instruction sets. The memory can include a program storage area and a data storage area. The program storage area can store instructions for implementing the operating system, instructions for implementing at least one function (such as a touch function, a sound playing function, an image playing function, etc.), instructions for implementing the method embodiments, and the like. The data storage area can also store data generated by a terminal when being used, and the like.

The camera is configured to capture images of the marker and can be an infrared camera or a color camera, and the type of the camera is not limited.

An embodiment of the present disclosure further provides a computer readable storage medium in which program codes are stored, and the program codes, when being called by a processor to execute the method in the above method embodiment.

The computer readable storage medium can be an electronic memory such as a flash memory, EEPROM, EPROM, hard disk, or ROM. Optionally, the computer readable storage medium comprises a non-volatile computer readable medium. The computer readable storage medium has a storage space for storing the program codes for executing any of the above method blocks. These program codes can be read from or written to one or more computer program products, and can be compressed in an appropriate form.

What is claimed is:

1. A three-dimensional display method, comprising:
determining, by a terminal device, target space coordinates of a target marker in a physical space;
converting, by the terminal device, the target space coordinates into rendering coordinates in a virtual space;
acquiring, by the terminal device, data of a virtual object to be displayed;
rendering, by the terminal device, the virtual object based on the data of the virtual object and the rendering coordinates to obtain a left-eye display content and a right-eye display content of the virtual object; and
displaying, by the terminal device, the left-eye display content and the right-eye display content, wherein the left-eye display content is projected onto a first optical lens, the right-eye display content is projected onto a second optical lens, and the first optical lens and the second optical lens respectively reflect the left-eye display content and the right-eye display content to a user's eyes;
wherein the displaying the left-eye display content and the right-eye display content comprises:
processing the left-eye display content and the right-eye display content based on an optical distortion model to obtain a left-eye pre-distorted image corresponding to the left-eye display content and a right-eye pre-distorted image corresponding to the right-eye display content, the optical distortion model being configured to fit an optical distortion generated by an optical lens; and
displaying the left-eye pre-distorted image and the right-eye pre-distorted image, wherein the left-eye pre-distorted image is projected onto the first optical lens and reflected by the first optical lens to a left eye of the user, and the right-eye pre-distorted image is projected onto the second optical lens and reflected by the second optical lens to a right eye of the user, so as to form a virtual image of an undistorted three-dimensional display content;
the method further comprising constructing the optical distortion model, wherein the constructing the optical distortion model comprises:
reading optical manufacturer data of the optical lens, the optical manufacturer data including coordinate data of an experimental image and coordinate data of an distorted virtual image corresponding to the experimental image; and performing a polynomial fitting on the coordinate data of the experimental image and the coordinate data of the distorted virtual image to construct the optical distortion model;

the performing the polynomial fitting comprises:

calculating a first distortion parameter and a second distortion parameter of the optical distortion model based on the coordinate data of the experimental image and the coordinate data of the distorted virtual image corresponding to the experimental image, wherein the first distortion parameter is a coefficient for fitting a distortion of the optical lens in a first direction, and the second distortion parameter is a coefficient for fitting a distortion of the optical lens in a second direction; and constructing the optical distortion model based on the first distortion parameter and the second distortion parameter.

2. The method of claim 1, wherein the converting the target space coordinates into the rendering coordinates in the virtual space comprises:

reading stored conversion parameters between a first spatial coordinate system and a second spatial coordinate system, wherein the first spatial coordinate system is a spatial coordinate system with a tracking camera as an origin in the physical space, and the second spatial coordinate system is a spatial coordinate system with a virtual camera as an origin in the virtual space; and converting the target space coordinates into the rendering coordinates in the virtual space based on the conversion parameters.

3. The method of claim 2, wherein the method further comprises acquiring the conversion parameters, wherein the acquiring the conversion parameters comprises:

displaying a virtual marker;

acquiring first coordinates of a physical marker in the first spatial coordinate system when an alignment determination operation by a user is detected, wherein the alignment determination operation indicates that the virtual marker is aligned with the physical marker;

acquiring second coordinates of the virtual marker in the second spatial coordinate system; and calculating the conversion parameters between the first spatial coordinate system and the second spatial coordinate system based on the first coordinates of the physical marker and the second coordinates of the virtual marker corresponding to the physical marker.

4. The method of claim 3, further comprising:

after acquiring the conversion parameters, adjusting at least one of a first camera parameter of the tracking camera and a second camera parameter of the virtual camera.

5. The method of claim 3, wherein the physical marker is disposed in a movement controllable mechanism, and the movement controllable mechanism is connected to the terminal device; the method further comprises:

prior to the acquiring the first coordinates of the physical marker in the first spatial coordinate system, receiving a movement control operation by the user;

transmitting a movement instruction to the movement controllable mechanism based on the movement control operation; and moving the movement controllable mechanism based on the movement instruction.

6. The method of claim 2, wherein the virtual camera comprises a left virtual camera and a right virtual camera; and the rendering the virtual object to obtain a left-eye display content and a right-eye display content of the virtual object comprises:

calculating pixel coordinates in the left virtual camera of the virtual object and pixel coordinates in the right virtual camera of the virtual object based on the rendering coordinates; and generating the left-eye display content according to the pixel coordinates in the left virtual camera, and the right-eye display content according to the pixel coordinates in the right virtual camera.

7. The method of claim 1, further comprising:

after the reading the optical manufacturer data of the optical lens, adjusting the coordinate data of the distorted virtual image based on a display parameter, wherein the display parameter comprises at least one of a zoom ratio, a screen size, a pixel size, or a position of an optical center of a screen of the terminal device.

8. A terminal device, comprising:

one or more processors;

a memory, the memory being coupled to the processor and storing a computer program stored therein, wherein the computer program, when executed by the one or more processors, causes the one or more processors to perform operations of:

acquiring target space coordinates of a target marker in a physical space;

converting the target space coordinates into rendering coordinates in a virtual space;

acquiring data of a virtual object to be displayed, and rendering the virtual object based on the data on the virtual object and the rendering coordinates; and generating, by the terminal device, a left-eye display content and a right-eye display content of the virtual object according to the rendered virtual object;

a display, configured to display the left-eye display content and the right-eye display content; and an optical module comprising a first optical lens and a second optical lens, wherein the left-eye display content is projected onto a first optical lens, the right-eye display content is projected onto a second optical lens, and the first optical lens and the second optical lens respectively reflect the left-eye display content and the right-eye display content to a user's eyes;

the displaying the left-eye display content and the right-eye display content comprises:

processing the left-eye display content and the right-eye display content based on an optical distortion model to obtain a left-eye pre-distorted image corresponding to the left-eye display content and a right-eye pre-distorted image corresponding to the right-eye display content, the optical distortion model being configured to fit an optical distortion generated by an optical lens; and displaying the left-eye pre-distorted image and the right-eye pre-distorted image, wherein the left-eye pre-distorted image is projected onto the first optical lens and reflected by the first optical lens to a left eye of the user, and the right-eye pre-distorted image is projected onto the second optical lens and reflected by the second optical lens to a right eye of the user, so as to form a virtual image of an undistorted three-dimensional display content;

the processor is further configured to perform an operation of constructing the optical distortion model, and the operation of constructing the optical distortion model comprises:

reading optical manufacturer data of the optical lens, the optical manufacturer data comprising coordinate data of an experimental image and coordinate data of an distorted virtual image corresponding to the experimental image; and performing a polynomial fitting on the coordinate data of the experimental image and the coordinate data of the distorted virtual image to construct the optical distortion model.

9. The terminal device of claim 8, wherein the converting the target space coordinates into the rendering coordinates in the virtual space comprises:

reading stored conversion parameters between a first spatial coordinate system and a second spatial coordinate system, wherein the first spatial coordinate system is a spatial coordinate system with a tracking camera as an origin in the physical space, and the second spatial coordinate system is a spatial coordinate system with a virtual camera as an origin in the virtual space; and converting the target space coordinates into the rendering coordinates in the virtual space based on the conversion parameters.

10. The terminal device of claim 9, wherein the processor is further configured to perform an operation of acquiring the conversion parameters, and the operation of acquiring the conversion parameters comprises:

displaying, by the display, a virtual marker;

acquiring first coordinates of a physical marker in the first spatial coordinate system when an alignment determination operation by a user is detected, wherein the alignment determination operation indicates that the virtual marker is aligned with the physical marker, and the virtual marker corresponds to the physical marker;

acquiring second coordinates of the virtual marker in a second spatial coordinate system; and calculating the conversion parameters between the first spatial coordinate system and the second spatial coordinate system based on the first coordinates of the physical marker and the second coordinates of the virtual marker corresponding to the physical marker.

11. A non-transitory computer readable storage medium having a program code stored thereon, wherein the program code, when executed by a processor, causes the processor to perform blocks of: determining, by a terminal device, target space coordinates of a target marker in a physical space; converting, by the terminal device, the target space coordinates into rendering coordinates in a virtual space; acquiring, by the terminal device, data of a virtual object to be displayed; rendering, by the terminal device, the virtual object based on the data of the virtual object and the rendering coordinates to obtain a left-eye display content and a right-eye display content of the virtual object; and displaying, by the terminal device, the left-eye display content and the right-eye display content, wherein the left-eye display content is projected onto a first optical lens, the right-eye display content is projected onto a second optical lens, the first optical lens and the second optical lens respectively reflect the left-eye display content and the right-eye display content to a user's eyes; wherein said displaying the left-eye display content and the right-eye display content comprises: processing the left-eye display content and the right-eye display content based on an optical distortion model to obtain a left-eye pre-distorted image corresponding to the left-eye display content and a right-eye pre-distorted image corresponding to the right-eye display content, the optical distortion model being configured to fit an optical distortion generated by an optical lens; and displaying the left-eye pre-distorted image and the right-eye pre-distorted image, wherein the left-eye pre-distorted image is projected onto the first optical lens and reflected by the first optical lens to a left eye of the user, and the right-eye pre-distorted image is projected onto the second optical lens and reflected by the second optical lens to a right eye of the user, so as to form a virtual image of an undistorted three-dimensional display content; wherein the program code, when being called by the processor, further causes the processor to perform an operation of constructing the optical distortion model, and the operation of constructing the optical distortion model comprises: reading optical manufacturer data of the optical lens, the optical manufacturer data including coordinate data of an experimental image and coordinate data of an distorted virtual image corresponding to the experimental image; and performing a polynomial fitting on the coordinate data of the experimental image and the coordinate data of the distorted virtual image to construct the optical distortion model.

12. The non-transitory computer readable medium of claim 11, wherein said converting the target space coordinates into the rendering coordinates in the virtual space comprises: reading stored conversion parameters between a first spatial coordinate system and a second spatial coordinate system, wherein the first spatial coordinate system is a spatial coordinate system with a tracking camera as an origin in the physical space, and the second spatial coordinate system is a spatial coordinate system with a virtual camera as an origin in the virtual space; and converting the target space coordinates into the rendering coordinates in the virtual space based on the conversion parameters.

13. The non-transitory computer readable medium of claim 12, wherein the program code, when being called by the processor, further causes the processor to perform an operation of acquiring the conversion parameters, and the operation of acquiring the conversion parameters comprises: displaying a virtual marker; acquiring first coordinates of a physical marker in the first spatial coordinate system when an alignment determination operation by a user is detected, wherein the alignment determination operation indicates that the virtual marker is aligned with the physical marker; acquiring second coordinates of the virtual marker in the second spatial coordinate system; and calculating the conversion parameters between the first spatial coordinate system and the second spatial coordinate system based on the first coordinates of the physical marker and the second coordinates of the virtual marker corresponding to the physical marker.

* * * * *